(12) United States Patent
Strauss et al.

(10) Patent No.: US 9,367,519 B2
(45) Date of Patent: Jun. 14, 2016

(54) SPARSE MATRIX DATA STRUCTURE

(71) Applicant: Microsoft Technology Licensing, LLC, Redmond, WA (US)

(72) Inventors: Karin Strauss, Seattle, WA (US); Jeremy Fowers, Gainesville, FL (US); Kalin Ovtcharov, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 334 days.

(21) Appl. No.: 14/015,894

(22) Filed: Aug. 30, 2013

(65) Prior Publication Data

US 2015/0067009 A1    Mar. 5, 2015

(51) Int. Cl.
*G06F 7/00* (2006.01)
*G06F 17/16* (2006.01)

(52) U.S. Cl.
CPC ..................... *G06F 17/16* (2013.01)

(58) Field of Classification Search
CPC ........................................ G06F 17/16
USPC ........................................ 708/203
See application file for complete search history.

(56) References Cited

U.S. PATENT DOCUMENTS

| | | | |
|---|---|---|---|
| 8,775,495 B2* | 7/2014 | Lumsdaine | G06F 17/16 708/520 |
| 2007/0198621 A1 | 8/2007 | Lumsdaine et al. | |
| 2011/0307685 A1* | 12/2011 | Song | G06F 17/10 712/16 |
| 2012/0143932 A1 | 6/2012 | Fossum | |
| 2012/0249560 A1* | 10/2012 | Dickenson | G06F 17/16 345/505 |
| 2012/0278376 A1 | 11/2012 | Bakos | |
| 2014/0108481 A1* | 4/2014 | Davis | G06F 17/16 708/607 |
| 2014/0298351 A1* | 10/2014 | Usui | G06F 17/16 718/107 |

FOREIGN PATENT DOCUMENTS

WO    2009037684 A2    3/2009

OTHER PUBLICATIONS

Nagar, et al., "A Sparse Matrix Personality for the Convey HC-1", Retrieved at<<http://www.conveycomputer.com/files/5213/5085/0736/bakos_fccm11_paper.pdf>>, In IEEE International Symposium on Field-Programmable Custom Computing Machines, May 1, 2011, pp. 8.

(Continued)

*Primary Examiner* — Tan V. Mai
(74) *Attorney, Agent, or Firm* — Sandy Swain; Micky Minhas

(57) ABSTRACT

Various embodiments relating to encoding a sparse matrix into a data structure format that may be efficiently processed via parallel processing of a computing system are provided. In one embodiment, a sparse matrix may be received. A set of designated rows of the sparse matrix may be traversed until all non-zero elements in the sparse matrix have been placed in a first array. Each time a row in the set is traversed, a next non-zero element in that row may be placed in the first array. If all non-zero elements for a given row of the set of designated rows have been placed in the first array, the given row may be replaced in the set of designated rows with a next unprocessed row of the sparse matrix. The data structure in which the sparse matrix is encoded may be outputted. The data structure may include the first array.

18 Claims, 5 Drawing Sheets

(56) References Cited

OTHER PUBLICATIONS

El-Kurdi, et al., "Hardware Acceleration for Finite-Element Electromagnetics: Efficient Sparse Matrix Floating-Point Computations with FPGAs", Retrieved at<< http://www.iml.ece.mcgill.ca/~wjgross/papers/ElKurdiGiannacopoulosGross_TransMag07.pdf>>, In IEEE Transactions on Magnetics, vol. 43, Issue 4, Apr. 2007, pp. 4.

Bell, et al., "Efficient Sparse Matrix-Vector Multiplication on CUDA", Retrieved at<<http://sbel.wisc.edu/Courses/ME964/Literature/techReportGarlandBell.pdf>>, In NVIDIA Technical Report, NVR-2008-004, Dec. 11, 2008, pp. 32.

Bell, et al., "Implementing Sparse Matrix-Vector Multiplication on Throughput-Oriented Processors", Retrieved at<<http://delivery.acm.org/10.1145/1660000/1654078/a18-bell.pdf?ip=203.8.109.15&acc=ACTIVE%20SERVICE&key=C2716FEBFA981EF1193B1DAAE4F8BDAFA31CC7C692744019&CFID=336256139&CFTOKEN=97759678&_acm_=1370581762_89bc760cfca0705de64e153cf94ca8e4>>, In Proceedings of the Conference on High Performance Computing Networking, Storage and Analysis, Nov. 14, 2009, pp. 11.

Zhang, et al., "FPGA vs. GPU for Sparse Matrix Vector Multiply", Retrieved at<<http://ieeexplore.ieee.org/stamp/stamp.jsp?tp=&arnumber=5377620>>, In International Conference on Field-Programmable Technology, Dec. 9, 2009, pp. 8.

Kestur, et al., "Towards a Universal FPGA Matrix-Vector Multiplication Architecture", Retrieved at<<http://www.cse.psu.edu/~kesturvy/kestur_spmv_fccm2012.pdf>>, In IEEE 20th Annual International Symposium on Field-Programmable Custom Computing Machines, Apr. 29, 2012, pp. 8.

Strauss, et al., "Storage-efficient FPGA Design for Streaming Applications with High-Bandwidth DRAM", U.S. Appl. No. 14/015,872, filed Aug. 30, 2013, pp. 33.

Liebmann, M., "Efficient PDE Solvers on Modern Hardware with Applications in Medical and Technical Sciences", PhD Thesis, University of Graz, Institute of Mathematics and Scientific Computing, Jul. 1, 2009, 110 Pages.

Dickov, B. et al., "Row-Interleaved Streaming Data Flow Implementation of Sparse Matrix Vector Multiplication in FPGA", in 4th HIPEAC Workshop on Reconfigurable Computing, Jan. 23, 2010, 10 Pages.

Monakov, A. et al., "Automatically Tuning Sparse Matrix-Vector Multiplication for GPU Architectures", in Journal Lecture Notes in Computer Science—High Performance Embedded Architectures and Compilers, vol. 5952, Jan. 25, 2010, 15 Pages.

Li, R. et al., "GPU-Accelerated Preconditioned Iterative Linear Solvers", in Research Report—UMSI 2010/112 Computer Science and Engineering, Oct. 1, 2010, 24 Pages.

Fowers, J. et al., "A High Memory Bandwidth FPGA Accelerator for Sparse Matrix-Vector Multiplication", in IEEE 22nd Annual International Symposium on Field Programmable Custom Computing Machines, May 11, 2014, 8 Pages.

ISA European Patent Office, International Search Report and Written Opinion issued in PCT/US2014/053316, Mar. 23, 2015, Netherlands, 16 Pages.

\* cited by examiner 204                              200
                     ↘                              ↙
                         COLUMNS
                 1   2   3   4   5   6   7   8   9

1 ⎡ 0   0   0   0   0   0   0   0   1 ⎤
             2 ⎢ 0   0   0   0   2   0   0   0   0 ⎥
   202       3 ⎢ 0   0   3   4   0   5   0   7   6 ⎥
    ↘        4 ⎢ 0   0   0   0   0   0   0   0   9 ⎥
    ROWS     5 ⎢ 0   0   0   0   8   0   0   0   0 ⎥
             6 ⎢ 0   0   1   3   0   2   0   5   4 ⎥
             7 ⎢ 0   0   0   0   0   0   0   0   6 ⎥
             8 ⎣ 0   0   0   0   7   0   0   0   0 ⎦

FIG. 2

300
                                       ↙
                              1  ⎡ 0 ⎤
                              2  ⎢ 0 ⎥
              302             3  ⎢ 2 ⎥
               ↘              4  ⎢ 0 ⎥
              ROWS            5  ⎢ 5 ⎥
                              6  ⎢ 0 ⎥
                              7  ⎢ 0 ⎥
                              8  ⎢ 6 ⎥
                              9  ⎣ 0 ⎦

FIG. 3

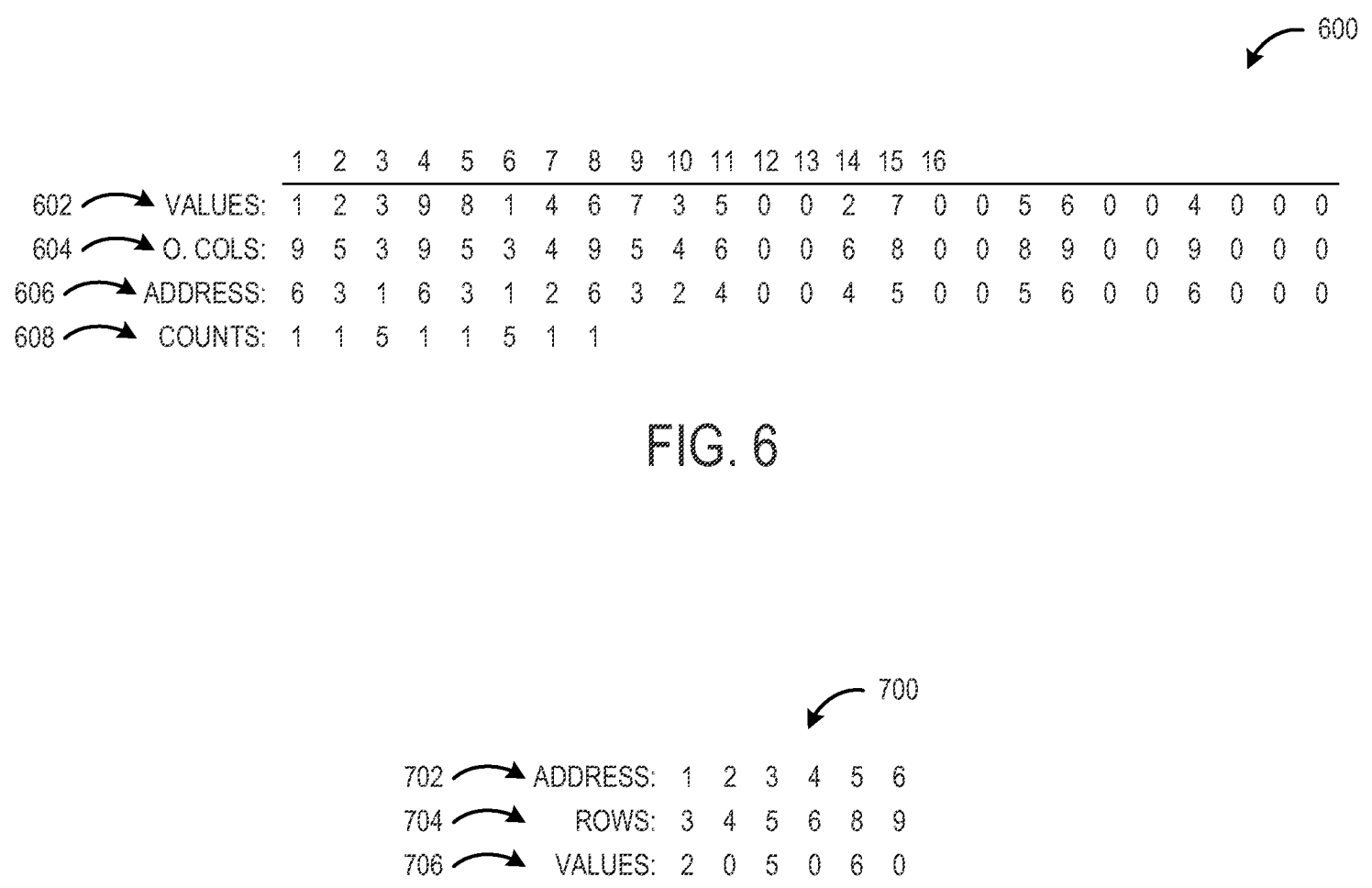

|         | 1 | 2 | 3 | 4 | 5 | 6 | 7 | 8 | 9 | 10 | 11 | 12 | 13 | 14 | 15 | 16 |
|---------|---|---|---|---|---|---|---|---|---|----|----|----|----|----|----|----|
| 602 → VALUES:   | 1 | 2 | 3 | 9 | 8 | 1 | 4 | 6 | 7 | 3  | 5  | 0  | 0  | 2  | 7  | 0  |
| 604 → O. COLS:  | 9 | 5 | 3 | 9 | 5 | 3 | 4 | 9 | 5 | 4  | 6  | 6  | 0  | 6  | 8  | 0  |
| 606 → ADDRESS:  | 6 | 3 | 1 | 6 | 3 | 1 | 2 | 6 | 3 | 2  | 4  | 4  | 0  | 4  | 5  | 0  |
| 608 → COUNTS:   | 1 | 1 | 1 | 5 | 1 | 1 | 1 | 1 | 1 | 1  | 1  | 0  | 0  | 1  | 1  | 0  |

FIG. 6

| | | | | | | |
|---|---|---|---|---|---|---|
| 702 → ADDRESS: | 1 | 2 | 3 | 4 | 5 | 6 |
| 704 → ROWS:    | 3 | 4 | 5 | 6 | 8 | 9 |
| 706 → VALUES:  | 2 | 0 | 5 | 0 | 6 | 0 |

FIG. 7

SPARSE MATRIX DATA STRUCTURE

BACKGROUND

Sparse matrices and sparse vectors may be encoded to reduce storage requirements and to increase processing efficiency. For example, by storing only the non-zero elements of sparse matrices and sparse vectors, reductions in storage requirements may be realized. One example of such an encoding format is a compressed sparse row (CSR) encoding format. In some cases, the processing performance of an encoding format may be highly dependent on the architecture of the device that performs computations using sparse matrices and sparse vectors encoded in that format. For example, encoding formats that place all elements of a row of a sparse matrix contiguously in an encoded array, such as the CSR encoding format, may be processed inefficiently by a computation device that is capable of processing multiple rows of a sparse matrix in parallel. Additionally or alternatively, the computation device may require additional logic, wiring, and/or buffers to process such an encoding efficiently enough to fully leverage the communications interface bandwidth.

SUMMARY

Various embodiments relating to encoding a sparse matrix into a data structure format that may be efficiently processed via parallel processing are provided. In one embodiment, a sparse matrix may be received. A set of designated rows of the sparse matrix may be traversed according to a deterministic sequence (e.g., round robin) until all non-zero elements in the sparse matrix have been placed in a first array. Each time a row in the set is traversed according to the deterministic sequence, a next non-zero element in that row may be placed in the first array, and each row in the set may have a first non-zero element placed in the first array before a second element from that row is placed in the first array. If all non-zero elements for a given row of the set of designated rows have been placed in the first array, the given row may be replaced in the set of designated rows with a next unprocessed row of the sparse matrix. A data structure in which the sparse matrix is encoded may be outputted. The data structure may include the first array.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 2 shows an example of sparse matrix according to an embodiment of the present disclosure.

FIG. 3 shows an example of sparse vector according to an embodiment of the present disclosure.

FIG. 6 shows the sparse matrix shown in FIG. 2 encoded into a data structure according to the method shown in FIGS. 4-5.

FIG. 7 shows an example of the sparse vector shown in FIG. 3 encoded into a data structure according to an embodiment of the present disclosure.

DETAILED DESCRIPTION

Figure 1:
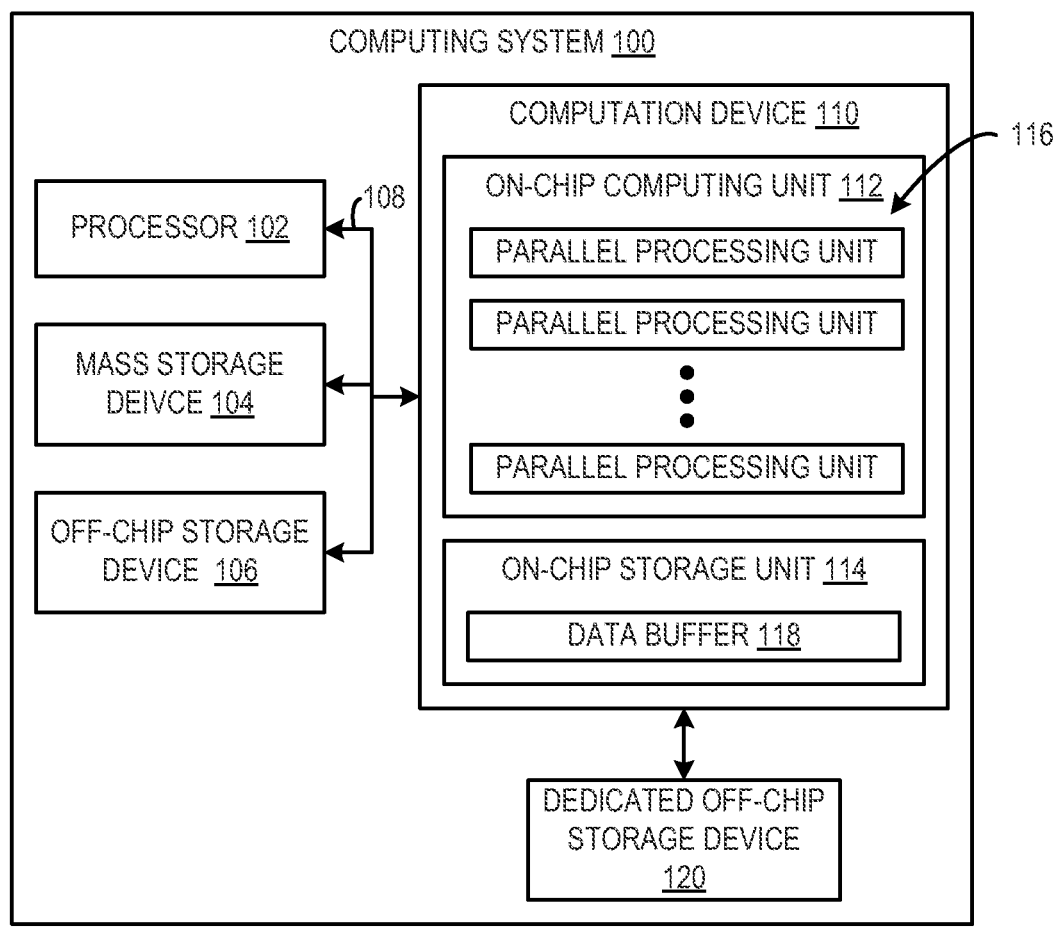
FIG. 1 schematically shows a computing system according to an embodiment of the present disclosure.

The present disclosure relates to an approach for representing a sparse matrix in a data structure. More particularly, the present disclosure relates to an approach for encoding a sparse matrix in a data structure in a manner that allows for highly efficient processing of the sparse matrix by a dedicated hardware computation device that processes rows of the sparse matrix in parallel.

In one example, a data structure according to the present disclosure may include a first array in which non-zero elements of a sparse matrix may be "pre-multiplexed" or "interleaved" according to a set of designated rows of the sparse matrix. For example, the non-zero elements may be interleaved into the first array based on a number of rows processed in parallel by the computation device. In other words, a set of designated rows of the sparse matrix that correspond to the number of rows processed in parallel may be traversed according to a deterministic sequence until all non-zero elements in the sparse matrix have been placed in the first array. Each time a row in the set is traversed according to the deterministic sequence, a next non-zero element in that row may be placed in the first array. If all non-zero elements for a given row of the set of designated rows have been placed in the first array, the given row may be replaced in the set of designated rows with a next unprocessed row of the sparse matrix.

By interleaving the non-zero elements of the sparse matrix into the first array, a parallel processing unit of the computation device may begin processing a row before every element of that row is received by the computation device. Moreover, multiple rows of the sparse matrix may be processed simultaneously by different parallel processing units. Accordingly, a sparse matrix encoded in this manner may be processed more efficiently and a complex routing network of the computation device may be simplified relative to an encoding of the sparse matrix in which all elements of a row are stored contiguously in an array, such as the compressed sparse row (CSR) encoding format.

Furthermore, a data structure representative of a sparse matrix according to the present disclosure may include a second array that includes column indices that are mapped to data buffer addresses of a data buffer of the computation device that stores a sparse vector. The column indices correspond to the non-zero elements of the sparse matrix placed in the first array. The sparse vector may be used to perform a computation with the sparse matrix (e.g., a sparse matrix-vector multiplication computation). By refactoring the sparse vector via mapping the column indices of the non-zero elements of the sparse matrix to the addresses of the data buffer that stores the sparse vector, no translation may be needed when the computation device accesses the sparse vector elements because the vector buffer addresses may be already stored in the encoding. In this way, on-chip buffering storage may be reduced relative to a configuration that processes an encoding that does not map column indices of non-zero elements in a sparse matrix to addresses of a data buffer that stores a sparse vector.

Although the pre-multiplexing technique to populate the first array and the refactoring or mapping technique to populate second array are discussed as being implemented in the same data structure, it will be understood that each technique may be implemented independently. In one example, a data structure includes the first array having the pre-multiplexed elements and does not include the second array having refactored elements. Rather, the data structure may include a second array having elements representative of locations of values of the first array organized in a different manner. In another example, a data structure includes the second array having refactored elements and does not include the first array having multiplexed elements. Rather, the data structure may include a first array having elements representative of values organized in a different manner.

It will be understood that the encoding of the sparse matrix and the corresponding data structure may be used in any suitable computation. For example, the encoded sparse matrix may be used in sparse matrix-vector multiplication, another operation that involves the combination of sparse matrix elements and sparse vector elements in some form, and/or an operation that uses information encoded in the sparse matrix to locate an element of a sparse vector. In another example, the herein described techniques may be applied to sparse matrix-matrix multiplication. It will be understood that when the dense representation of the sparse matrix is encoded into the data structure, the sparse matrix may undergo a transformative process that results in the information representative of the sparse matrix being able to be processed by a hardware computation device more quickly via parallel processing. In one example, the sparse matrix representation may enable an increase in efficiency of operation of a computation device to fully leverage high-bandwidth communication capabilities. Moreover, the increase in efficiency may allow for the computation device to be employed in real-time machine learning applications where the computation device may be continuously invoked to quickly perform computations. Such machine learning may be applicable to image recognition, speech recognition, webpage ranking, and natural language processing and text search. In one example, the computation device may be utilized for training and evaluating deep neural networks. In another example, the computation device may be utilized in factoring large numbers, among other applications.

FIG. 1 schematically shows an embodiment of a computing system 100. The computing system 100 may be configured to process data structures representative of sparse matrices and sparse vectors. The computing system 100 may take the form of one or more personal computers, server computers, tablet computers, home-entertainment computers, network computing devices, gaming devices, mobile computing devices (e.g., tablet), mobile communication devices (e.g., smart phone), and/or other computing devices. The computing system 100 may include a processor 102 in communication with a mass storage device 104 and an off-chip storage device 106 via a communications interface 108.

The processor 102 may include one or more processor cores, and instructions executed thereon may be configured for sequential, parallel, and/or distributed processing. Individual components of the processor optionally may be distributed among two or more separate devices, which may be remotely located and/or configured for coordinated processing. Aspects of the processor may be virtualized and executed by remotely accessible, networked computing devices configured in a cloud-computing configuration.

The processor 102 may include one or more physical devices configured to execute instructions. For example, the processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The mass storage device 104 may include one or more physical devices configured to hold instructions executable by the processor 102. When such instructions are implemented, the state of the mass storage device 104 may be transformed—e.g., to hold different data. The mass storage device 104 may include removable and/or built-in devices. The mass storage device 104 may include optical memory, semiconductor memory, and/or magnetic memory, among others. The mass storage device 104 may include volatile, nonvolatile, dynamic, static, read/write, read-only, random-access, sequential-access, location-addressable, file-addressable, and/or content-addressable devices.

Instructions stored in the mass storage device 104 may be executed by the processor 102 using portions of the off-chip storage device 106. The off-chip storage device 106 may include one or more physical devices configured to hold data utilized to carry out execution of the instructions, and store a result when applicable. For example, the off-chip storage device may include one or more volatile memory devices. In one particular example, the off-chip storage device 104 includes dynamic random-access memory (DRAM). It should be understood that the off-chip storage device may include any suitable type of storage device without departing from the scope of the present description.

In one example, instructions may be executed as part of a software program that may utilize various computations as part of execution. As such, the computing system 100 may include a specialized computation device 110 configured to perform specific computations in a very fast and efficient manner. The computation device 110 may be implemented in dedicated hardware as a logic circuit distinct from the processor 102, and linked to the processor 102 by the communications interface 108. For example, the processor 102 may execute an instruction that invokes the computation device 110 to perform computations specified by the instruction. The computation device 110 may be configured to receive the instruction to perform the computations from the software program, retrieve data elements from the off-chip storage device 106 to carry out the computations, process the computations, and return results of the computation to the off-chip storage device. Such a routine may be carried out repeatedly or continuously throughout execution of the software program, such that data may be streamed from the off-chip storage device to the computation device.

Furthermore, the processor 102 may be configured to execute instructions that encode a sparse matrix into a data structure that may be stored in the off-chip storage device 106 and sent to the computation device 110 to perform a computation as will be discussed in further detail below. For example, the sparse matrix may be stored in a dense format (e.g., including zero and non-zero elements) in the mass storage device 104, the off-chip storage device 106, or may be received from another computing device that may be physically distinct from the computing system 100. The software program executed by the processor 102 may be configured to transform the dense representation of the sparse matrix into the data structure. The data structure may be outputted to the off-chip storage device 106 and sent to the computation device 110 to perform one or more computations.

The hardware in which the computation device 110 is implemented may be an integrated circuit such as a programmable logic device (PLD) or application specific integrated circuit (ASIC). A field programmable gate array (FPGA) and a complex programmable logic device (CPLD) are two examples of suitable PLDs that may be used to implement the computation device 110. The computation device 110 may be logically separated from the processor 102 and may include an on-chip computing unit 112 and an on-chip storage unit 114. In some embodiments, the on-chip computing unit 112 may include a plurality of parallel processing units configured to process different rows of a sparse matrix in parallel as part of performing a computation. Further, the on-chip storage device 114 may be formed separate from the off-chip storage device 106. Note that, in some instances, 'on-chip' means that the component is physically integrated with the computation device, and 'off-chip' means that the component is physically distinct from the computation device.

In some embodiments, the computation device 110 may be implemented as a system-on-chip ("SoC"). In a SoC implementation, typically the processor 102, the off-chip storage device 106, and the computation device 110, are formed as separate logic units within a single SoC integrated circuit, and the communications interface 108 includes an on-chip communications interface subsystem to enable communication between these separate logic units. In some embodiments, the processor 102 and the computation device 110 may be physically integrated in the same chip. Further, the off-chip storage may or may not be integrated in that chip. In some embodiments, the computation device 110 may be in communication with a dedicated off-chip storage device 120 that is physically separate from the off-chip storage device 106. In some embodiments, the dedicated off-chip storage device 120 may only be accessible by the computation device 110. In one example, the off-chip storage device 120 includes DRAM dedicated to the computation device 110. In other embodiments, the off-chip storage device 106 and the dedicated off-chip storage device 120 may be the same device.

Communications interface 108 refers generally to one or more communications subsystems provided to enable communications among the various components of the computing system 100. The communications interface 108 may include one or more discrete I/O paths, each potentially utilizing separate protocols, encodings, and/or physical interfaces. In particular, the communications interface 108 may be configured to provide high-bandwidth communication between the off-chip storage device 106 and the computation device 110, such that data elements may be continuously streamed in multiple data streams from the off-chip storage device to the computation device to perform computations. More particularly, each data stream may be sent from the off-chip storage device 106 to a different parallel processing unit of a plurality of parallel processing units 116 of the computation device 110. In one particular example, the communications interface provides up to 32 separate data streams between the off-chip storage device 106 and the computation device 110. It should be understood that the communications interface may provide any suitable number of data streams between the off-chip storage device and the computation device without departing from the scope of the present description.

In one example, the computation device 110 may be configured to perform computations in the form of sparse matrix-vector multiplication. In particular, a sparse matrix-vector multiplication computation may include multiplying each row of a sparse matrix by a vector. The sparse matrix may be encoded in a data structure that may be stored in the off-chip storage device 106. The data structure may be streamed from the off-chip storage device 106 to the computation device 110 according to the bandwidth capability of the communications interface 108. For example, each row of the sparse matrix may be sent as a different data stream. More particularly, each data stream may be sent from the off-chip storage device 106 to a different parallel processing unit of the plurality of parallel processing units 116. In some embodiments, a parallel processing unit may process every row value in a given row of the sparse matrix, and each parallel processing unit may process a different row in parallel. In one particular example, the communications interface 108 may be capable of streaming up to 32 sparse matrix rows in parallel.

Furthermore, the vector may be stored in the on-chip storage device 114 of the computation device 110. More particularly, the vector may be stored in a data buffer 118 of the on-chip storage device 114. In one example, the data buffer 118 is a banked data buffer in which each bank may be independently addressable. In some embodiments, an addressing scheme of the data buffer and a sparse structure of the vector may be fixed and known in advance of the computation to allow for suitable encoding of the sparse matrix that maps to the addresses of the vector buffer. Note that although the vector elements are stored in the on-chip storage device during processing of the sparse matrix, it will be understood that the vector elements may be occasionally brought from the off-chip storage device or the mass storage device to the on-chip storage device. For example, values of a first vector may be replaced in the data buffer with values from a second different vector when operation switches to performing computations involving the second vector.

To parallelize the sparse matrix-vector multiplication computation, multiple rows of elements of the sparse matrix may be multiplied by the elements of the vector in parallel. In particular, as the data structure representing the sparse matrix is received by the computation device, the on-chip processor 112 may be configured to parse the data structure into different rows of the sparse matrix and each of the plurality of parallel processing units 116 of the on-chip processor 112 may be configured to process a different row of the sparse matrix in parallel.

FIG. 2 shows an example of a sparse matrix 200 according to an embodiment of the present disclosure. The sparse matrix 200 is shown as a dense representation in which zero and non-zero elements are included. In this example, the sparse matrix 200 includes eight rows indicated by row indices 202 and nine columns indicated by column indices 204. Generally, the rows may be traversed from top-to-bottom and the columns may be traversed from left-to-right. It will be understood that a sparse matrix may include any suitable number of rows and columns. The illustrated example of the sparse matrix may be referred to herein below in the context of encoding the sparse matrix into a data structure.

FIG. 3 shows an example of a sparse vector 300 according to an embodiment of the present disclosure. The sparse vector 300 is shown as a dense representation in which zero and non-zero elements are included. In this example, the sparse vector 300 includes nine rows or locations indicated by indices 302. In particular, the indices identify a location of an element in the sparse vector. Generally, the rows or locations may be traversed from top-to-bottom (or first-to-last). It will be understood that a sparse vector may include any suitable number of rows or locations. The illustrated example of the sparse vector may be referred to herein below in the context of encoding a sparse matrix into a data structure.

Figure 4:
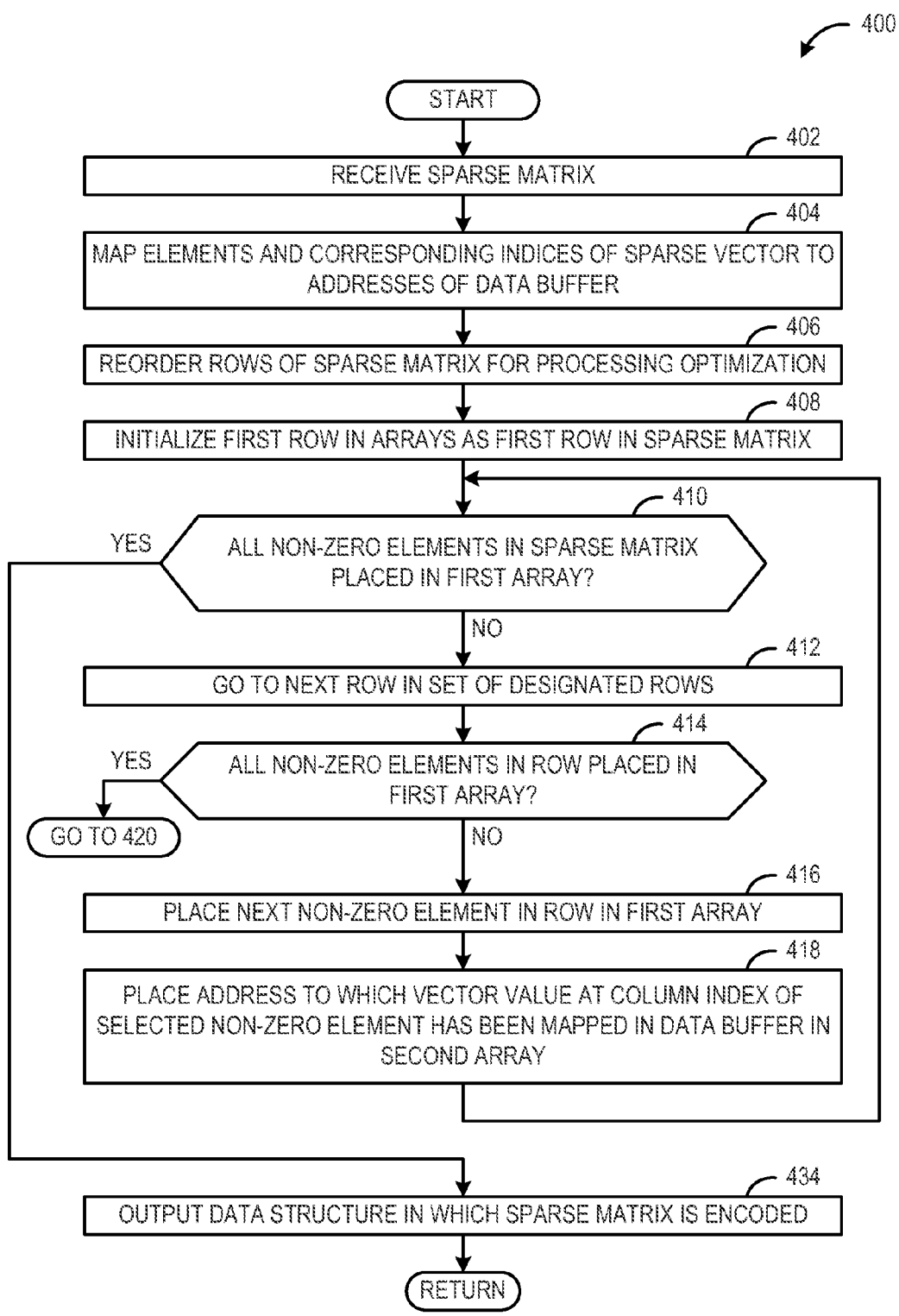
FIGS. 4-5 show a method for encoding a sparse matrix into a data structure according to an embodiment of the present disclosure.
Figure 5:
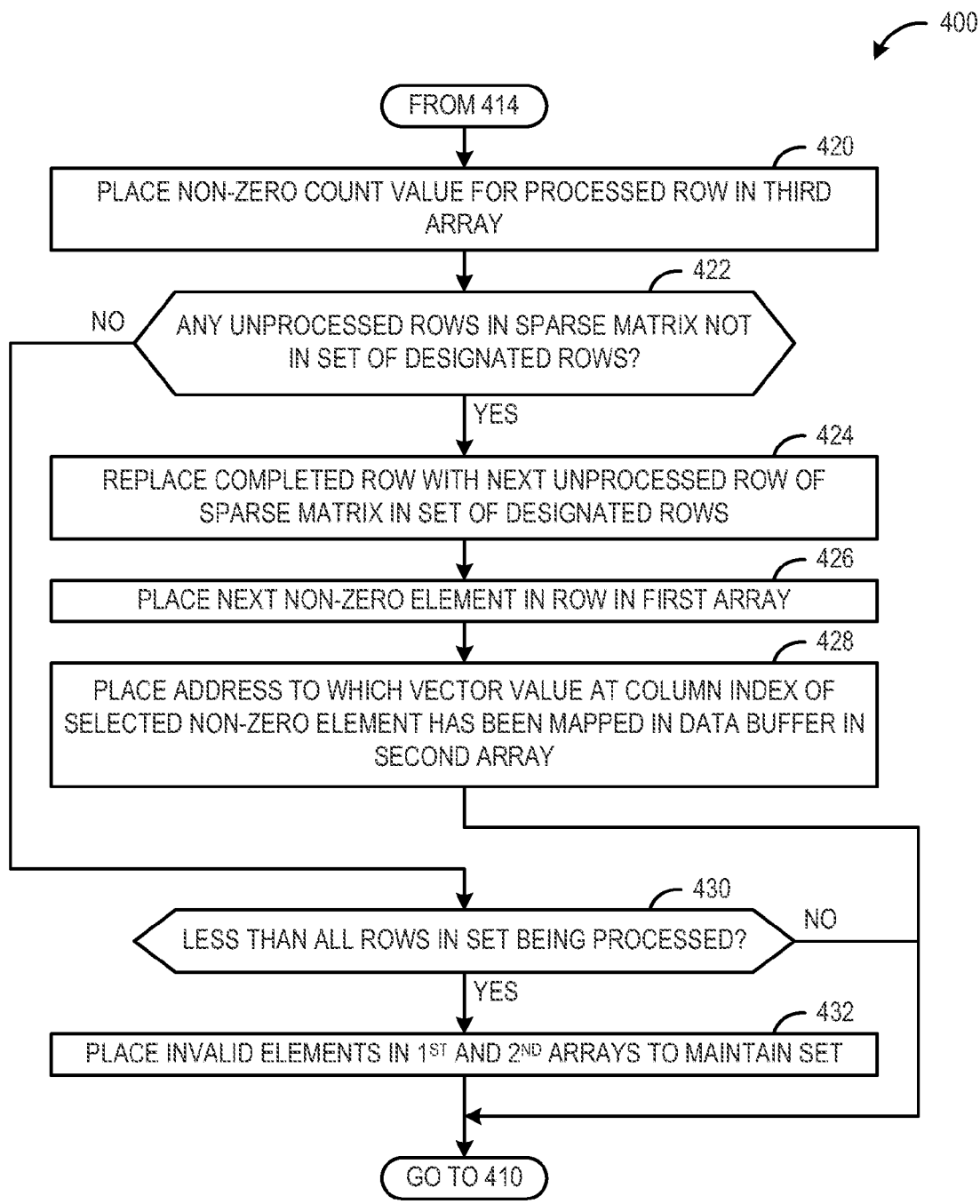

FIGS. 4-5 show a method 400 for encoding a sparse matrix into a data structure according to an embodiment of the present disclosure. For example, the method 400 may be performed by the computing system 100 shown in FIG. 1. FIGS. 6 and 7 show data structures that may be used to perform and/or produced by the method 400.

FIG. 6 shows an example of the sparse matrix 200 shown in FIG. 2 encoded into a data structure 600 according to the method shown in FIG. 4. The data structure 600 includes a first array 602 in which non-zero elements of the sparse matrix may be stored. Column indices 604 of the non-zero elements are shown for purposes of clarity, but are not actually stored as part of the data structure 600. The data structure 600 includes a second array 606 in which addresses of the data buffer 118 where the column indices 604 of the non-zero elements that are mapped to the data buffer addresses may be stored. The data structure 600 includes a third array 608 including a count value for each row of the sparse matrix. Alternatively, in some embodiments, the third array 608 may include offsets or pointers indicating where a new row of the sparse matrix starts in the first and second arrays. In the illustrated example, the sparse matrix includes eight rows, and the third array includes eight count values. The count values indicate how many non-zero elements are included in each row of the sparse matrix. The illustrated embodiment of the data structure includes three arrays, although it will be appreciated that the data structure may include any suitable number of arrays without departing from the scope of the present disclosure. Note that in some embodiments one or more of the first, second, and/or third arrays may be implemented as more than one array. For example, the first array may be split into two arrays.

FIG. 7 shows an example of the sparse vector 300 encoded into a data structure 700 that may be stored in the data buffer 118 shown in FIG. 1. The data structure 700 of the sparse vector may be used to encode the sparse matrix 200 into the data structure 600. Address locations 702 of the data buffer 118 that hold the sparse vector elements and indices 704 of the sparse vector elements stored in the data buffer are shown for purposes of clarity, but are not actually stored as part of the data structure 700. The data structure 700 includes a first array 706 in which the elements (e.g., values) of the sparse vector may be stored. The elements of the sparse vector may be associated with the addresses of the data buffer by traversing the rows of the sparse vector from top-to-bottom (e.g., the first element is stored at the first address).

Since the number of rows to be processed in parallel, the addressing scheme of the vector buffer, and the sparsity structure of the vector may be fixed while the encodings are used, and known in advance of encoding the sparse matrix and the sparse vector, such a priori knowledge may be leveraged to omit elements from being stored in the data structures in order to reduce storage size of the data structures, yet make efficient use of the parallel processing units. In the illustrated example, it may be assumed that elements in rows 1, 2, and 7 of the sparse vector will always be zero. As such, these elements may be omitted from the data structure 700. It will be appreciated that any suitable number of elements may be omitted from being stored in the data structures described herein based on a priori knowledge of the sparse vector (and/or the sparse matrix) without departing from the scope of the present disclosure. The sparse matrix 200 encoded in the data structure 600 shown in FIG. 6 and the sparse vector 300 encoded in the data structure 700 shown in FIG. 7 will be referenced throughout discussion of the method 400.

At 402, the method 400 may include receiving the sparse matrix. For example, the sparse matrix may be stored in a dense format (e.g., including zero and non-zero elements) in the mass storage device 104, the off-chip storage device 106, or may be received from another computing device that may be physically distinct from the computing system 100 shown in FIG. 1.

In some embodiments, the sparse matrix may be encoded in a different format, and receiving the sparse matrix may include decoding the sparse matrix from the other format before encoding the sparse matrix into the data structure. In another example, the sparse matrix may be directly translated from another format to the encoding of the present disclosure.

At 404, the method 400 may include mapping elements and corresponding indices of the sparse vector to addresses of the data buffer. Note that, in practice, the sparse vector values are only known at runtime, and the row index-to-address mapping is known prior to runtime. The reindexing of the column addresses of the sparse matrix allows for the sparse matrix to be processed more efficiently.

Note that, in the example shown in FIG. 7, the elements in rows 1, 2, and 7 of the sparse vector 300 are omitted from the data structure 700 based on stored data indicating a priori knowledge of the sparse vector that those elements will always be zero.

Optionally or additionally, at 406, the method 400 may include reordering the rows of the sparse matrix to optimize processing of the sparse matrix. For example, reordering the rows may include order longest rows first to reduce imbalance at the end of the process. In another example, reorder the rows may include reordering input vector elements to reduce conflict between banks of the data buffer.

At 408, the method 400 may include initializing the first row in the first array, the second array, and the third array as the first row of the sparse matrix. By initializing the first row in the arrays as the first row in the sparse matrix, a starting point may be established to track when every row in the matrix has been traversed and processed when traversing the sparse matrix according to a deterministic sequence (e.g. round robin). It will be understood that any suitable deterministic sequence may be employed to traverse the sparse matrix.

At 410, the method 400 may include determining whether all non-zero elements in the sparse matrix have been placed in the first array 602 of the data structure 600. If all non-zero elements of the sparse matrix have been placed in the first array, then the method 400 moves to 434. Otherwise, the method 400 moves to 412.

At 412, the method 400 may include going to the next row in a set of designated rows. For example, the number of rows designated to be in the set may correspond to a number of rows that the computation device 110 shown in FIG. 1 may be configured to process in parallel. In the illustrated example, for the sake of simplicity and ease of understanding, the set includes 4 rows. It will be appreciated that the set may include any suitable number of rows without departing from the scope of the present disclosure. When going to the next row in the set of designated rows, the rows may be traversed according to a deterministic sequence. For example, the rows may be traversed from top-to-bottom in the set in a round robin fashion, but rows pointed to by the set may not be in the same order as the array order. It will be understood that rows may be traversed in any suitable manner without departing from the scope of the present disclosure. Further, it will be understood that multiple rows may be accessed simultaneously.

At 414, the method 400 may include determining whether all-non zero elements in that row have been placed in the first array 602. If all non-zero elements of that row have been placed in the first array, then the method 400 moves to 420. Otherwise, the method 400 moves to 416.

At 416, the method 400 may include placing a next non-zero element in that row in the first array 602. When placing the next non-zero element in that row, elements in that row may be traversed from left-to-right. However, elements may be traversed in a different manner without departing from the scope of the present disclosure.

At 418, the method 400 may include placing an address to which a vector value at a column index of that next non-zero element has been mapped in the data buffer in a corresponding position in the second array 606. Alternatively, in some embodiments, the address may be replaced with a column index similar to the second array of the CSR encoding format. Accordingly, the method may include placing a column index of that next non-zero element in a corresponding position in the second array 606.

At 420, the method 400 may include placing a non-zero count value for the completed row in the third array 608. Alternatively, in some embodiments, the non-zero element count values may be replaced with an element index encoding similar to the third array of the CSR encoding format. In particular, the third array may include a list of the list of value indexes where each row of the sparse matrix starts. In other words, the indexes map a first element of each row in the sparse matrix to a position in the value array. Accordingly, the method may include for each row of the sparse matrix, placing a value corresponding to a position in the first array of a first non-zero element in that row in the third array.

At 422, the method 400 may include determining whether any unprocessed rows in the sparse matrix are not in the set of designated rows. In one example, an unprocessed row may be defined as a row that has not had any non-zero elements placed in the first array and has not been included in the set of designated rows. If there are any unprocessed rows in the sparse matrix, then the method 400 moves to 424. Otherwise, the method 400 moves to 430.

At 424, the method 400 may include replacing a completed row with the next unprocessed row in the sparse matrix in the set of designated rows. In one example, a completed row may be defined as a row in which all non-zero elements have been placed in the first array 602. Further, a row may be considered being processed if that row is included in the set of designated rows and not all non-zero elements in that row have been placed in the first array 602. Note that if a row has no non-zero elements, then that row may be replaced with a next row that has non-zero elements. The row that has no non-zero elements may or may not be represented by a null counter in the third array depending on the embodiment of the data structure.

At 426, the method 400 may include placing a next non-zero element in that row in the first array 602.

At 428, the method 400 may include placing an address to which a vector value at a column index of that next non-zero element has been mapped in the data buffer in a corresponding position in the second array 606. Alternatively, in some embodiments, the address may be replaced with a column index similar to the second array of the CSR encoding format. Accordingly, the method may include placing a column index of that next non-zero element in a corresponding position in the second array 606. Next, the method returns to 410 to continue populating the first array with non-zero elements and the second array with corresponding column indices of the non-zero elements mapped to data buffer addresses.

At 430, the method 400 may include determining whether less than all rows in the set are being processed. In other words, it may be determined whether there are any completed rows in the set that cannot be replaced because all other rows in the sparse matrix have been completed. If there are any completed rows then the method 400 moves to 432. Otherwise, the method 400 returns to 410 to continue populating the first and second arrays.

At 432, the method 400 may include placing invalid entries in the first array and the second array to maintain a number of array entries per set. For example, if the set includes four rows and only three rows are still being processed, invalid entries may be added to the first and second arrays that represent the fourth row. In one example, invalid entries include zeros. By adding the invalid entries when less than all rows in a set are being processed, proper multiplexing or spacing may be maintained in the arrays, so that the appropriate elements may be sent to the appropriate parallel processing unit during decoding of the data structure. Next, the method returns to 404 to continue populating the first array with non-zero elements and the second array with corresponding column indices of the non-zero elements mapped to data buffer addresses.

At 434, the method 400 may include outputting the data structure in which the sparse matrix is encoded. The data structure may include the first array, the second array, and the third array. For example, the data structure may be output to a storage location of the computing system 100, such as the off-chip storage device 106. In some embodiments, the data structure may be output to the computation device 110 to perform a computation using the data structure that represents the sparse matrix and the sparse vector, such as a sparse matrix-vector multiplication computation.

The method may be performed to transform the dense representation of the sparse matrix into the data structure. The data structure may allow for more efficient processing of the sparse matrix via parallel processing, such as by the computation device 110 shown in FIG. 1. In particular, by traversing the rows of the set to place elements in the first array, the elements may be interleaved in the encoding according to the parallel processing configuration of the computation device. In other words, by placing the elements in the first array in this order, the elements can be loaded from memory into the parallel processing units and processed more continuously and directly to increase efficiency of the computation device.

Furthermore, because the column indices of the elements in the first array are mapped to the addressing scheme of the data buffer, there may be a one-to-one correspondence between the logical block in the encoding and the physical block in the computation device. Accordingly, the hardware of the computation device may be made less complex.

Applying the method 400 to the sparse matrix 200 may result in the first array 602, the second array 606, and the third array 608 of the data structure 600 being populated with the values in the order shown in FIG. 6. In particular, the set of designated rows initially includes rows 1-4 of the sparse matrix 200. Beginning with row 1 (i.e., the next row in the set), the next non-zero element in that row (i.e., value 1) is placed in the first array as the first element. The column index of that non-zero element is column 9, which maps to address 6 of the data buffer. So, the value 6 is placed in the second array as the first element.

Next, row 2 is traversed and the next non-zero element in that row (i.e., value 2) is placed in the first array as the second element. The column index of that non-zero element is column 5, which maps to address 3 of the data buffer. So, the value 3 is placed in the second array as the second element.

Next, row 3 is traversed and the next non-zero element in that row (i.e., value 3) is placed in the first array as the third element. The column index of that non-zero element is column 3, which maps to address 1 of the data buffer. So, the value 1 is placed in the second array as the third element.

Next, row 4 is traversed and the next non-zero element in that row (i.e., value 9) is placed in the first array as the fourth element. The column index of that non-zero element is column 9, which maps to address 6 of the data buffer. So, the value 6 is placed in the second array as the fourth element.

Since row 4 is the last row in the set, row traversal returns to the first row in the set, which is row 1. Since there are no more non-zero elements in row 1, row 1 is replaced with the next unprocessed row in the sparse matrix 200 (i.e., row 5) in the set. Since the first row is completed the non-zero count value for the first row may be placed in the third array. At this point, the set of designated rows includes rows 5, 2, 3, and 4. Next, row 5 is traversed and the next non-zero element in that row (i.e., value 8) is placed in the first array as the fifth element. The column index of that non-zero element is column 5, which maps to address 3 of the data buffer. So, the value 3 is placed in the second array as the fifth element.

Next, row 2 is traversed and since there are no more non-zero elements in row 2, row 2 is replaced with the next unprocessed row in the sparse matrix 200 (i.e., row 6) in the set. Since the second row is completed the non-zero count value for the second row may be placed in the third array. At this point, the set of designated rows includes rows 5, 6, 3, and 4. Next, row 6 is traversed and the next non-zero element in that row (i.e., value 1) is placed in the first array as the sixth element. The column index of that non-zero element is column 3, which maps to address 1 of the data buffer. So, the value 1 is placed in the second array as the sixth element.

Next, row 3 is traversed and the next non-zero element in that row (i.e., value 4) is placed in the first array as the seventh element. The column index of that non-zero element is column 4, which maps to address 2 of the data buffer. So, the value 4 is placed in the second array as the seventh element.

Next, row 4 is traversed and since there are no more non-zero elements in row 4, row 4 is replaced with the next unprocessed row in the sparse matrix 200 (i.e., row 7) in the set. Since the fourth row is completed the non-zero count value for the fourth row may be placed in the third array. At this point, the set of designated rows includes rows 5, 6, 3, and 7. Next, row 7 is traversed and the next non-zero element in that row (i.e., value 6) is placed in the first array as the eighth element. The column index of that non-zero element is column 9, which maps to address 6 of the data buffer. So, the value 6 is placed in the second array as the eighth element.

Next, row 5 is traversed and since there are no more non-zero elements in row 5, row 5 is replaced with the next unprocessed row in the sparse matrix 200 (i.e., row 8) in the set. Since the fifth row is completed the non-zero count value for the fifth row may be placed in the third array. At this point, the set of designated rows includes rows 8, 6, 3, and 7. Next, row 8 is traversed and the next non-zero element in that row (i.e., value 7) is placed in the first array as the ninth element. The column index of that non-zero element is column 5, which maps to address 3 of the data buffer. So, the value 3 is placed in the second array as the ninth element.

Next, row 6 is traversed and the next non-zero element in that row (i.e., value 3) is placed in the first array as the tenth element. The column index of that non-zero element is column 4, which maps to address 2 of the data buffer. So, the value 2 is placed in the second array as the tenth element.

Next, row 3 is traversed and the next non-zero element in that row (i.e., value 5) is placed in the first array as the eleventh element. The column index of that non-zero element is column 6, which maps to address 4 of the data buffer. So, the value 4 is placed in the second array as the eleventh element.

Next, row 7 is traversed and since there are no more non-zero elements in row 7 and no more unprocessed rows in the sparse matrix to be added to the set, invalid entries in the form of zeros are placed in the first and second arrays as the twelfth elements. The zeros are placed in the arrays to maintain proper multiplexing of elements within the set so as to align with the number of parallel processing units processing the rows of the sparse matrix (e.g., 4). Since the seventh row is completed the non-zero count value for the seventh row may be placed in the third array.

Next, row 8 is traversed and since there are no more non-zero elements in row 8 and no more unprocessed rows in the sparse matrix invalid entries in the form of zeros are placed in the first and second arrays as the thirteenth elements. Since the eighth row is completed the non-zero count value for the eighth row may be placed in the third array. Next, row 6 is traversed and the next non-zero element in that row (i.e., value 2) is placed in the first array as the fourteenth element. The column index of that non-zero element is column 6, which maps to address 4 of the data buffer. So, the value 4 is placed in the second array as the fourteenth element.

Next, row 3 is traversed and the next non-zero element in that row (i.e., values 7) is placed in the first array as the fifteenth element. The column index of that non-zero element is column 8, which maps to address 5 of the data buffer. So, the value 5 is placed in the second array as the fourteenth element.

Since the other rows in the set are completed, zeros are placed in the first and second arrays as the sixteenth and seventeenth elements to maintain proper multiplexing. The encoding of the sparse matrix continues in this manner until all non-zero elements of the sparse matrix have been placed in the first array.

The third array may be populated by counting a number of non-zero elements in each row of the sparse matrix. For example, the first row includes one non-zero element, so the value 1 is placed in the third array as the first element. The second row includes one non-zero element, so the value 1 is placed in the third array as the second element. The third row includes five non-zero elements, so the value 5 is placed in the third array as the third element, and so on until all rows of the sparse matrix have been accounted for in the third array.

It will be understood that although zeros are used as initial markers in the arrays, any suitable symbols may be used without departing from the scope of the present disclosure, and the herein described approach for encoding a sparse matrix may be broadly applicable to such sparse matrices.

Although the sparse matrix encoding approach has been discussed in the context of being processed by a computation device including a plurality of parallel processing units, it will be understood that the sparse matrix encoding approach may be processed by any suitable computing system without departing from the scope of the present disclosure. For example, the encoding may also be used by CPUs, CPUs with vector units, GPUs, and other suitable types of computing devices.

Although the sparse matrix encoding approach has been discussed in the context of training and evaluating deep neural networks, it will be understood that the sparse matrix encoding approach may be employed for any suitable processing operations without departing from the scope of the present disclosure.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for encoding a sparse matrix into a data structure, the data structure including a first array, the method comprising:
    on a computing system including a computation device including a plurality of parallel processing units:
        receiving the sparse matrix;
        traversing a set of designated rows of the sparse matrix according to a deterministic sequence until all non-zero elements in the sparse matrix have been placed in the first array, wherein the sparse matrix is utilized by the computation device to perform a computation, and wherein a number of designated rows in the set corresponds to a number of parallel processing units of the computation device;
        each time a row of the set is traversed according to the deterministic sequence, placing a next non-zero element in that row in the first array, wherein each row in the set has a first non-zero element placed in the first array before a second element from that row is placed in the first array;
        if all non-zero elements for a given row of the set of designated rows have been placed in the first array, replacing the given row in the set of designated rows with a next unprocessed row of the sparse matrix; and
        outputting, to a storage device of the computing system, the data structure in which the sparse matrix is encoded.

2. The method of claim 1, wherein the data structure further includes a second array, and the method further comprises:
    mapping elements and corresponding indices of a sparse vector to addresses of a data buffer of the computation device, wherein the sparse vector is selected to perform a computation with the sparse matrix utilizing the parallel processing units of the computation device; and
    each time a next non-zero element is placed in the first array, placing an address to which a vector value at a column index of that next non-zero element has been mapped in the data buffer in a corresponding position in the second array.

3. The method of claim 2, wherein the number of designated rows in the set, the addressing scheme of the data buffer, and a structure of the vector are known a priori.

4. The method of claim 1, wherein the data structure further includes a second array, and the method further comprises, each time a next non-zero element is placed in the first array, placing a column index of that next non-zero element in a corresponding position in the second array.

5. The method of claim 4, further comprising:
    placing invalid elements into the first array and/or the second array to maintain a number of entries that corresponds to a number of rows in the set.

6. The method of claim 1, wherein the data structure further includes a third array, and the method further comprises for each row of the sparse matrix, placing a value corresponding to a number of non-zero elements in that row into the third array.

7. The method of claim 1, wherein the data structure further includes a third array, and the method further comprises for each row of the sparse matrix, placing a value corresponding to a position in the first array of a first non-zero element in that row in the third array.

8. The method of claim 1, further comprising:
    reordering one or more rows of the sparse matrix prior to placing non-zero elements in the first array.

9. A computing system comprising:
    a computation device including a plurality of parallel processing units;
    a processor physically distinct from the computation device; and
    a storage device holding instructions executable by the processor to:
        receive a sparse matrix;
        traverse a set of designated rows of the sparse matrix according to a deterministic sequence until all non-zero elements in the sparse matrix have been placed in a first array, wherein the sparse matrix is utilized by the computation device to perform a computation, and wherein a number of designated rows in the set corresponds to a number of parallel processing units of the computation device;
        each time a row of the set is traversed according to the deterministic sequence, place a next non-zero element in that row in the first array, wherein each row in the set has a first non-zero element placed in the first array before a second element from that row is place in the first array; and
        if all non-zero elements for a given row of the set of designated rows have been placed in the first array, replace the given row in the set of designated rows with a next unprocessed row of the sparse matrix; and
        output, to the storage device, a data structure in which the sparse matrix is encoded, wherein the data structure includes the first array.

10. The computing system of claim 9, wherein the computation device includes a data buffer, and wherein the storage device further holds instructions executable by the processor to:
    map elements and corresponding indices of a sparse vector to addresses of the data buffer, and
    each time a next non-zero element is placed in the first array, place an address to which a vector value at a column index of that next non-zero element has been mapped in the data buffer in a corresponding position in a second array, wherein the data structure includes the second array.

11. The computing system of claim 10, wherein the number of designated rows in the set, the addressing scheme of the data buffer, and a structure of the vector are known a priori.

12. The computing system of claim 9, wherein the storage device further holds instructions executable by the processor to:
    each time a next non-zero element is placed in the first array, place a column index of that next non-zero element in a corresponding position in a second array, wherein the data structure includes the second array.

13. The computing system of claim 12, wherein the storage device further holds instructions executable by the processor to:
    place invalid elements into the first array and/or the second array to maintain a number of entries that corresponds to a number of rows in the set.

14. The computing system of claim 9, wherein the storage device further holds instructions executable by the processor to:
    for each row of the sparse matrix, place a value corresponding to a number of non-zero elements in that row into a third array, wherein the data structure includes the third array.

15. The computing system of claim 9, wherein the storage device further holds instructions executable by the processor to:

for each row of the sparse matrix, place a value corresponding to a position in the first array of a first non-zero element in that row in a third array, wherein the data structure includes the third array.

16. The computing system of claim 9, wherein the storage device further holds instructions executable by the processor to:
reorder one or more rows of the sparse matrix prior to placing non-zero elements in the first array.

17. A method for encoding a sparse matrix into a data structure including a first array and a second array, the method comprising:
on a computing system including a computation device including a plurality of parallel processing units:
receiving the sparse matrix;
mapping elements and corresponding indices of a sparse vector to addresses of the data buffer, wherein the sparse vector is selected to perform a computation with the sparse matrix;
traversing a set of designated rows of the sparse matrix according to a deterministic sequence until all non-zero elements in the sparse matrix have been placed in the first array, wherein the sparse matrix is utilized by the computation device to perform a computation, and wherein a number of designated rows in the set corresponds to a number of parallel processing units of the computation device;
each time a row of the set is traversed according to the deterministic sequence, placing a next non-zero element in that row in the first array, wherein each row in the set has a first non-zero element placed in the first array before a second element from that row is placed in the first array;
each time a next non-zero element is placed in the first array, placing an address to which a vector value at a column index of that next non-zero element has been mapped in the data buffer in a corresponding position in a second array;
if all non-zero elements for a given row of the set of designated rows have been placed in the first array, replacing the given row in the set of designated rows with a next unprocessed row of the sparse matrix; and
outputting, to a storage device of the computing system, the data structure in which the sparse matrix is encoded, wherein the data structure includes the first array and the second array.

18. The method of claim 17, wherein the data structure further includes a third array, and the method further comprises for each row of the sparse matrix, placing a value corresponding to a number of non-zero elements in that row into the third array.

* * * * *